United States Patent [19]

Schänzer

[11] 3,945,593

[45] Mar. 23, 1976

[54] FLIGHT CONTROL APPARATUS

[75] Inventor: Gunther W. Schänzer, Uberlingen (Bodensee), Germany

[73] Assignee: Bodenseewerk Geratetechnik GmbH, Uberlingen (Bodensee), Germany

[22] Filed: June 20, 1974

[21] Appl. No.: 481,310

Related U.S. Application Data

[63] Continuation-in-part of Ser. Nos. 295,898, Oct. 10, 1972, abandoned, and Ser. No. 295,899, Oct. 10, 1972, abandoned.

[52] U.S. Cl. ............................. 244/77 D; 235/150.2
[51] Int. Cl.² ........................................ B64C 13/50
[58] Field of Search .............. 244/77 D, 77 C, 77 A; 235/150.2, 150.22

[56] References Cited
UNITED STATES PATENTS

| | | | |
|---|---|---|---|
| 2,798,682 | 7/1957 | Alderson et al. | 244/77 D |
| 3,594,553 | 7/1971 | McElroy | 235/150.22 X |
| 3,601,339 | 8/1972 | Watson | 244/77 A |
| 3,614,036 | 10/1971 | Foster | 244/77 D |
| 3,618,878 | 11/1971 | Klein et al. | 244/77 D |

*Primary Examiner*—Duane A. Reger
*Assistant Examiner*—Barry L. Kelmachter
*Attorney, Agent, or Firm*—Darbo, Robertson & Vandenburgh

[57] ABSTRACT

A flight control apparatus for the control of the trajectory and the airspeed of an airplane comprises a measuring equipment for measuring the deviation of the aircraft position from a commanded trajectory, and a measuring equipment for measuring the deviation of the angle of attack from a commanded value. Both deviation signals are applied with appropriate transfer functions to both the throttle actuator and to the control surface actuator. The transfer functions, which in the simplest case are constants, may be selected such that a deviation of the trajectory and its correction is substantially without any influence on the angle of attack and a deviation of the airspeed and its correction is substantially without any influence on the trajectory. According to another aspect of the invention, the apparatus measures altitude, angle of attack, pitch rate and vertical and longitudinal acceleration of the aircraft. There is a pseudo-observer including a number of appropriately dimensioned filters to form a number of additional state variables derived from the variables directly measured, the additional state variables comprising the time integrals of both the trajectory deviation signal and the angle of attack deviation signal, and a signal indicative of vertical speed. All measured and derived signals are applied in linear combinations to a throttle actuator, a spoiler actuator and an elevator actuator. The output of the elevator actuator is applied to a model system simulating the actual elevator movements and applying a feedback signal to the elevator actuator.

13 Claims, 2 Drawing Figures

FLIGHT CONTROL APPARATUS

RELATED APPLICATIONS

This application is a continuation in part of my two prior applications Ser. Nos. 295,898 and 295,899, both filed Oct. 10, 1972, both now abandoned, the disclosures of which are incorporated herein by reference. Under 35 U.S.C. 120, the applicant claims the benefit of Oct. 10, 1972 as the filing date of all the disclosure herein.

BACKGROUND AND SUMMARY OF THE INVENTION

This invention relates to a flight control apparatus for the control of the trajectory and of the aerodynamic condition of flow (for example, of the air speed) of airplanes, comprising a measuring arrangement for the aircraft position, a measuring arrangement for the aerodynamic condition of flow, a thrust-changing actuator and at least one actuator for a control surface of the aircraft (for example, the elevator) including inputs for command values for trajectory and aerodynamic condition of flow, further comprising means for forming deviation signals from the signals of the measuring arrangements and of the associated command values, and comprising means for controlling the actuators in dependence on such deviation signals in a sense of reducing the deviations.

In conventional flight control apparatus separate control systems are provided for the aerodynamic condition of flow, such as the air speed relative to the ambient air, and for the trajectory. The air speed is usually derived by means of a dynamic pressures sensor, and is compared to a command value. The deviation signal is applied to an actuator for the throttle and thus effects a change of the engine thrust in a sense counteracting the air speed deviation. The operation of the control system for the attitude control and trajectory control (automatic pilot and damper) is completely independent thereof.

It includes a measuring arrangement for the position of the aircraft, for example, an altimeter. The signal thus obtained is compared to a command value and the deviation signal thus formed is applied to an automatic pilot acting, for example, on the elevator through a servomotor. In case of an elevational deviation the elevator is then actuated so that the aircraft climbs or descends as necessary to correct the deviation.

In addition to automatic pilot, damper and speed controller in some applications, recently a direct lift control (DLC) has been provided for improving the trajectory control, for increasing the touch-down accuracy, for increasing passenger comfort and for reducing aircraft cell load, in which, for example, vertical acceleration and angle of attack signals are applied to a lift-changing regulating means (such as lift flaps or spoilers).

Moreover, it is prior art to apply additional flight state variables to the speed controller and the automatic pilot so as to improve the control performance. Thus, by way of example, in a prior speed controller a longitudinal acceleration signal from a longitudinal accelerometer is connected in opposition to the deviation signal in order to reduce the throttle activity. If the aircraft is subjected to a gust from ahead so that the relative speed between aircraft and ambient air is temporarily increased, the aircraft is simultaneously decelerated with respect to ground whereby a declaration signal is generated. These signals can be made to cancel each other and the control apparatus does not react with throttle activity to such gusts — similar to the human pilot (British patent specification No. 1,190,199).

Also in other speed controllers longitudinal acceleration signals are applied in order to obtain a damping of the control loop, the longitudinal acceleration signal replacing the otherwise hard-to-form time derivative of the speed signal. A signal proportional to the pitch angle speed and derived from a rate gyro is, for example, applied for damping to that channel of an automatic pilot controlling the servomotor for the elevator.

These prior art flight control apparatus, namely speed control apparatus, direct lift control means (DLC) and automatic pilots suffer from the shortcoming that the control systems separated instrumentally, e.g. for air speed or the like and for trajectory, are intercoupled via the performance of the aircraft. An intervention in one control system causes a disturbance in the other one, and vice versa. By way of example, it shall be assumed that the altimeter indicates too great an elevation with respect to the commanded elevation. The automatic pilot then initiates a descent in order to again obtain the commanded elevation. In so doing, however, potential energy of the aircraft is converted to kinetic energy and the air speed increases. Thus, by the correction of the deviation in the trajectory control system by the automatic pilot a disturbance of the air speed control system is caused. This disturbance must be counteracted by an intervention of the speed controller. Conversely a change in thrust generally involves a change in the trajectory angle so that the aircraft climbs or descends, thus changes its trajectory. It is obvious that such a type of control tends to result in rather large deviations and small damping. It is extremely difficult with such a flight control apparatus comprising a separate speed control apparatus and automatic pilot to guide the aircraft with respect to trajectory and speed with the accuracy required, for example for an automatic STOL-landing.

In order to avoid these difficulties it is known to apply to the speed controller, in addition to the air-speed-deviation signal $\alpha u$, a signal proportional to the vertical acceleration or the acceleration in the direction of the aircraft yaw axis. This prior arrangement (British patent specification No. 1,190,198) is intended for a type of aircraft in which a change in thrust primarily affects the trajectory and an elevator adjustment primarily affects the air speed. By the signal proportional to the vertical acceleration $\ddot{h}$, a deviation from the constant flight altitude or a straight glide path is determined and used for trajectory control on the shortest signal path, namely via the speed controller. Also in this prior arrangement there are a separate speed controller and an automatic pilot, the former only acting on the throttle and the latter acting only on the elevator. Also this prior art apparatus encounters the previously described difficulties which by the additional application of the vertical acceleration to the speed control apparatus are insufficiently alleviated and only for the special case of straight trajectories flown at constant speed.

Modern control theory teaches that an optimum control is obtained if all state variables relevant to the performance of the controlled system are applied in a suitable linear combination to all actuators provided. In practice, however, this theoretical requirement cannot be met in general. In the case of complex control systems the number of the condition variables to be considered becomes too great and part of these condition variables is not readily measurable.

It is an object of this invention to provide a flight control apparatus capable of maintaining a given trajectory — which might be curved — and given air speeds of the aircraft with very good accuracy, while providing low throttle activity and high passenger comfort.

It is a more specific object of this invention to reduce the influence of the air speed control on the trajectory control, and vice versa, which is particularly great in STOL-airplanes having great lift factors.

In accordance with the broad concept of the invention there is apparatus for controlling the trajectory and aerodynamic condition of flow of an airplane having thrust changing actuator means and control surface actuator means. Said apparatus comprises trajectory sensor means for producing an acutal trajectory signal, aerodynamic condition of flow sensor means for producing an actual aerodynamic of flow signal, trajectory deviation detector means having a command value input and being connected to the trajectory sensor means to produce a trajectory deviation signal indicative of the deviation of the actual trajectory signal from a commanded value, aerodynamic condition of flow deviation detector means having a command value input and being connected to the aerodynamic condition of flow sensor means to produce an aerodynamic condition of flow deviation signal indicative of the deviation of the actual aerodynamic condition of flow signal from a command value, and control means connected to the actuator means and to the deviation detector means for controlling the actuators in accordance with said deviation signals. Said control means control the thrust changing actuator means in response to first control signals, which are related to the signals from both of the deviation detector means by given associated transfer functions, and control the control surface actuator means in response to second signals which are related to the signals from both of the deviation detector means by given associated transfer functions.

The transfer functions may be just coefficients, the signals from both of the deviation detector means being applied directly with these coefficients to both of said actuator means. Alternatively, the signals from both of said deviation detector means are applied to both of the actuator means through filters, i.e. with appropriate transfer functions, as the characteristics of the system may require.

Said coefficients or transfer functions may be selected to reduce the mutual influence of the two controlled variables, namely trajectory and aerodynamic condition of flow.

When applying the deviation signal for the trajectory (for example, the elevational deviation) only to the actuator for the associated control surface (for example, the elevator), then, as described above, in addition to the trajectory also the aerodynamic condition of flow (for example, the air speed or the angle of attack) is influenced thereby. On the other hand, when applying the deviation signal only to the thrust-determining actuator (throttle) the trajectory as well as the air speed can be influenced thereby. Therefore, the signal from the measuring arrangement for the trajectory, both when applied to the thrust-determining actuator and also when applied to the actuator for the elevator, for example, also influences the aerodynamic condition of flow and the air speed. By simultaneously applying the trajectory deviation signal with appropriate factors and appropriate sign to the thrust-determining actuator and to the respective control surface (elevator) actuator, it is possible to substantially compensate the two influences of the trajectory deviation signal on the aerodynamic condition of flow. Thus, the combined intervention has no effect on the aerodynamic condition of flow. However, there is a resultant influence on the trajectory counteracting the deviation.

The same considerations apply to a deviation of the aerodynamic condition of flow. An application of the aerodynamic condition of flow deviation signal to the throttle only does not only influence the aerodynamic condition of flow but also the flight altitude via a change in the angle of attack and, consequently, in the lift. An application of the deviation signal to the elevator alone does not only cause a change in the air speed — via the conversion of potential energy to kinetic energy or vice versa — but, of course, also a change in the flight altitude. The aerodynamic condition of flow deviation signal can be applied both to the throttle and also to the elevator with such factors and sign that its effects on the flight altitude are completely or substantially compensated. However, a resultant influence on the air speed is maintained. By using such an instrumentally integrated flight control apparatus for trajectory and aerodynamic condition of flow, the control operations for these quantities can actually be decoupled, leading to a substantial improvement of the control accuracy, of gust and thermal wind suppression, to reduced throttle activity and improved passenger comfort. At the same time the integrated flight control apparatus permits a greater freedom in the selection of the control parameters for the control of each individual controlled variable.

It is already advantageous if the factors or transfer functions are selected to reduce the mutual influence of the control operations. Preferably, however, the coefficients of the linear combinations and the filter time constants are selected so that a deviation of the trajectory and its correction is substantially without any influence on the aerodynamic condition of flow and a deviation of the aerodynamic condition of flow and its correction is substantially without any influence on the trajectory.

In accordance with another aspect of the invention, a flight control apparatus for automatically controlling the position and the aerodynamic condition of flow of an aircraft comprises devices for producing state variable signals including first measuring means for producing a first signal indicative of aircraft position, such as altitude, second measuring means for producing a second signal indicative of aerodynamic condition of flow, such as angle of attack, first command signal generating means for producing an aircraft position command signal, second command signal generating means for producing an aerodynamic condition of flow command signal, a first comparator means for comparing said first signal and said aircraft position command signal to produce a position deviation signal, second comparator means for comparing said second signal and said aerodynamic condition of flow command signal to produce a flow condition deviation signal. A thrust actuator has an input and is adapted to vary the thrust of the aircraft in response to signals at the input thereof. A control surface actuator has an input and is adapted to vary the deflection of a control surface of the aircraft, such as the elevator, in response to signals at the input thereof. Circuit means are connected to said devices and the inputs of said actuators for applying a plurality of signals at each of said inputs as linear combinations, each signal of said plurality of signals being indicative of one state variable. Said plurality of signals includes said position deviation signal, said flow condition deviation signal, the time integral of said position deviation signal, the time integral of said flow condition deviation signal and a signal indicative of vertical speed. Said circuit means comprise at least one of each of the following items:

a. direct connection means for directly applying a state variable signal as one signal out of said plurality and b. filter means connected to receive one of said state variable signals and from it to produce another state variable signal which then is applied to said inputs as being one of said plurality of signals.

It has been found that a selection of state variables sufficient to provide the accurate control of trajectory and aerodynamic condition of flow of an aircraft can be derived either by direct measurement or by appropriate filtering of directly measured quantities. The state variables thus obtained are applied in linear combinations to both the thrust and aerodynamic condition of flow actuators.

Preferably each of the state variables is also applied to a servomotor actuating a control surface, such as a spoiler, for direct lift control.

DESCRIPTION OF SPECIFIC EMBODIMENT

Figure 1:
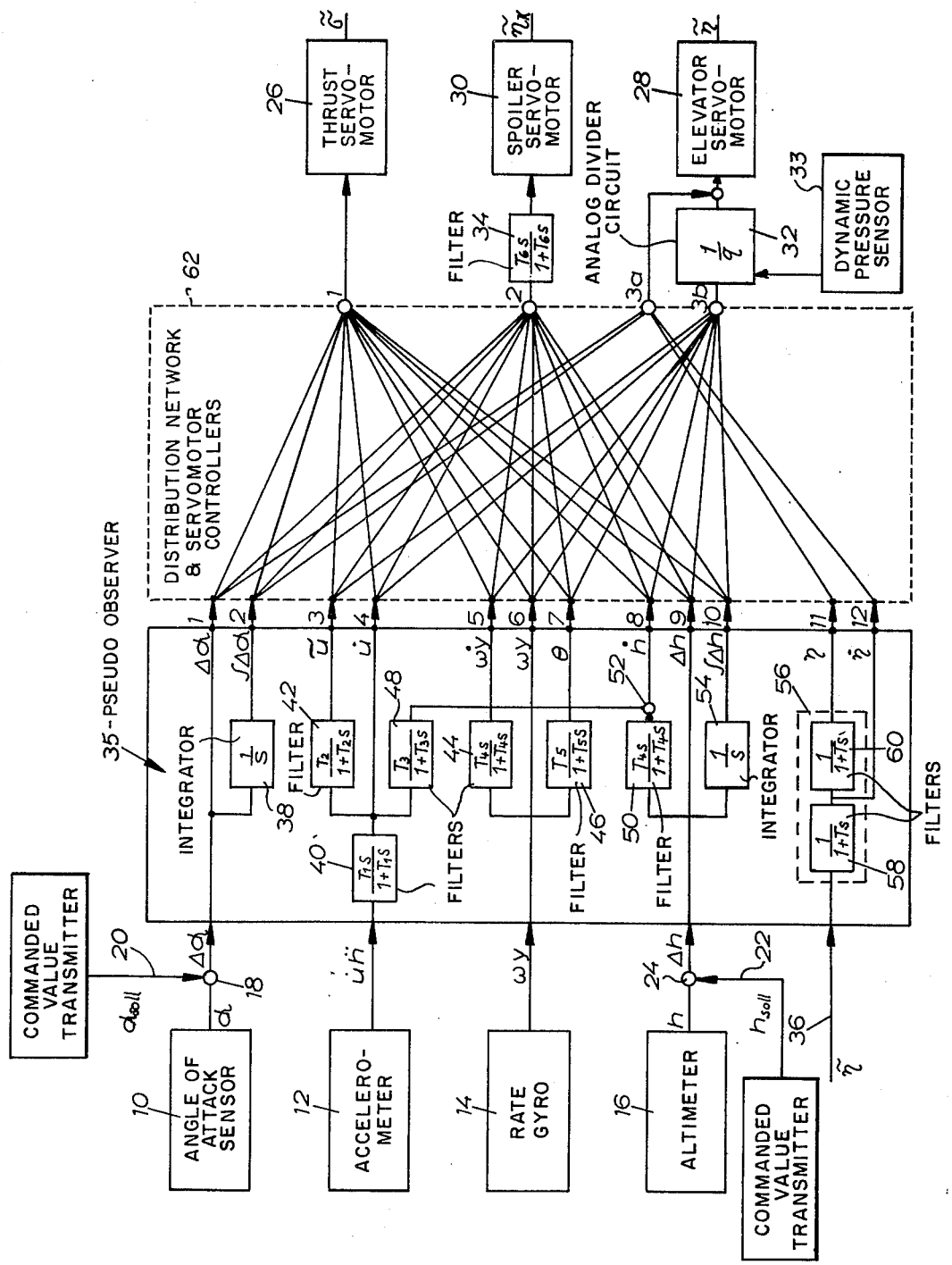
FIG. 1 is a signal flow diagram of an integrated flight controller designed in accordance with this invention.

The following terminology is employed herein:

K — coefficients with which the various input signals to the matrix circuit are linearly combined at the various outputs
k — a constant
s — the variable of the Laplace transform
t — time
T — time constant of the filters
$\alpha$ — angle of attack
$\theta$ — pitch angle
$h$ — elevation
$\ddot{h}$ — vertical acceleration
$u$ — speed
$\tilde{u}$ — speed signal
$\dot{u}$ — longitudinal acceleration
$\omega_y$ — pitch rate
$\dot{\omega}_y$ — angular acceleration about the pitch axis
$\omega_o$ — characteristic frequency of the elevator system
$\eta$ — elevator deflection
$\dot{\eta}$ — elevator speed
$\tilde{\eta}$ - output of elevator servomotor strict integration has a transfer function of 1/s.
pseudointegration has a transfer function of $$\frac{T}{1+Ts}.$$

the result of employing usual integrating networks.
pseudodifferentiation — a differentiation by means of a differentiating network having a transfer function of $$\frac{Ts}{1+Ts}.$$

observer — a device that detects all "state variables" in a system.
pseudoobserver — a device that detects an appropriate selection of all "state variables" in a system.
observation filter — a filter which derives one state variable from another, directly measured, state variable.

The flight controller according to the invention includes an angle of attack measuring transmitter 10 (i.e. aerodynamic condition of flow sensor means) for producing a condition of flow signal, accelerometer 12 producing a signal indicating the longitudinal acceleration $\dot{u}$ and the vertical acceleration $\ddot{h}$, a rate gyro 14 for measuring the pitch rate and producing an indicative signal. A signal indicative of an actual trajectory measurement is produced by a trajectory sensor, as for example an altimeter 16. In a deviation detector 18 the signal $\alpha$ representing the measured angle of attack is compared with a commanded value $\alpha_{soll}$ signal from a commanded value transmitter 20 to produce a deviation signal $\Delta \alpha$. Accordingly, in a deviation detector 24 the altimeter signal $h$ is compared with a commanded value $h_{soll}$ from a commanded value transmitter 22 and an elevational deviation signal $\Delta h$ is formed. The command value transmitter 20, 22 could, for example, each be the knob 382 and the bridge 370 of U.S. Pat. No. 2,738,682.

There are three servomotors, i.e. a thrust-servomotor 26 (i.e. thrust changing actuator means) by which an adjustment of the throttle is effected, an elevator-servomotor 28 (i.e. control surface actuator means) for adjusting the elevator, and a spoiler-servomotor 30 (i.e. spoiler actuator means) by which a spoiler of the wing is adjusted to affect the direct lift. The elevator-servomotor 28 is preceded by a conventional analogue divider circuit 32 such as described in *Halbleiter-Schaltungstechnik*, Springer Verlag (1971) pages 282 –299, to which a dynamic pressure signal from dynamic pressure sensor 33 (which may be, for example, a Prandtl-tube) is applied and which effects a division by the dynamic pressure. Thereby, the control surface effectiveness of the elevator, increased with increased dynamic pressure (increased air speed) is taken into consideration. The spoiler-servomotor 30 is preceded by a high-pass filter 34. As spoiler or lift flaps shall only operate in a given operating range and only two command values ($\alpha_{soll}$, $h_{soll}$) exist, the stationary condition of all signals for direct lift control must be eliminated by this high-pass filter 34. The output of the elevator-servomotor 28 is $\tilde{\eta}$. A set of state variables or "state vector" is formed from the measured quantities $\alpha$, $\dot{u}$, $\ddot{h}$, $\omega_y$ and $h$. This is accomplished by means of a "pseudoobserver" generally referenced 35. At an input 36 the output of the elevator-servomotor 28 in the form of a signal $\tilde{\eta}$ is also applied to this pseudoobserver 35. The state variables utilized by the pseudoobserver 35 in producing state vector output signals are as follows:

a. The deviation $\Delta \alpha$ of the angle of attack formed in deviation detector 18 by difference formation from the commanded value $\alpha_{soll}$ and the measured angle of attack $\alpha$.

b. The integral of angle of attack deviation $\int \Delta \alpha \, dt$ which is formed by means of a strict integrator 38 from the value of $\Delta\alpha$ derived from deviation detector 18.

c. The air speed $u$. This is obtained from the longitudinal acceleration $\dot{u}$ by pseudointegration by means of a low-pass filter 42, the steady state final value being eliminated by a high-pass filter 40. The resultant transfer function of filters 40 and 42 is $$\left(\frac{T_1 s}{1 + T_1 s}\right)\left(\frac{T_2}{1 + T_2 s}\right).$$

d. The time derivative of the air speed. It is obtained from the longitudinal acceleration supplied by the accelerometer 12, the steady state final value being eliminated by high-pass filter 40 having a transfer function $$\left(\frac{T_1 s}{1 + T_1 s}\right).$$

e. The angular acceleration about the pitch axis $\dot{\omega}_y$. It is obtained from the pitch rate signal $\omega_y$ of the rate gyro 14 by pseudodifferentiation by means of a high-pass filter 44 having a transfer function $$\left(\frac{T_4 s}{1 + T_4 s}\right).$$

f. The pitch angle $\tilde{\theta}$. It is also derived from the pitch rate signal $\omega_y$ by pseudointegration by means of a filter 46 having a transfer function $$\left(\frac{T_5}{1 + T_5 s}\right).$$

g. The vertical speed $\dot{h}$. It is obtained redundant, namely on one hand by pseudointegrating the vertical acceleration $\ddot{h}$ through high-pass filter 40, which eliminates the steady-state final value, and by means of low-pass filter 48 having a transfer function $$\left(\frac{T_3}{1 + T_3 s}\right)$$

and on the other hand by pseudodifferentiating the elevational deviation signal $\Delta h$ by means of filter 50, having a transfer function $$\left(\frac{T_4 s}{1 + T_4 s}\right).$$

These two signals are interconnected at point 52. The complementary filters 48 and 50, respectively, perform in accordance with the following equation:

$$\dot{h} = \frac{s}{1 + Ts} \Delta h + ks \frac{1}{1 + Ts} \ddot{h}$$

$$= \frac{s + ks^2}{1 + Ts} \Delta h = s \Delta h \frac{1 + ks}{1 + Ts}$$

with $k = T$
$\dot{h} = s \Delta h$.

h. The altitude deviation signal $\Delta h$ is formed directly in deviation detector 24 by difference formation from the altitude signal h measured by the altimeter 16 and the commanded altitude $h_{soll}$ supplied by the commanded value transmitter 22.

i. The time integral of the altitude deviation, i.e. $\int \Delta h \, dt$, is obtained from the signal $\Delta h$ from deviation detector 24 by strict integration in an integrator 54.

j. From the output signal $\tilde{\eta}$ of the elevator-servomotor 28, which is supplied to the pseudoobserver 35 through the input 36, the control surface deflection $\eta$ and its time derivation (i.e. speed) $\dot{\eta}$ are formed by means of a model system or simulator 56 simulating the performance of the elevator.

The elevator deflection cannot be measured directly. Though it is possible to measure the regulating movement carried out by the elevator-servomotor, however, the actual elevator deflection may greatly differ from the servomotor output by looseness, elasticity and oscillations of the elevator. Therefore, the elevator deflection and its time derivative are as additional state variables from the elevator-servomotor output by means of model system 56. Signals $\eta$ and $\dot{\eta}$ are applied in linear combination to the input 3a of the elevator-servomotor 28 as feedback.

The elevator model (or simulator) may, for example, be an oscillator of second order which is formed a series-connection of two low-pass filters 58 and 60 each having a transfer function of the form $$\left(\frac{1}{1 + Ts}\right)$$

with corresponding feedback, the signal for the elevator deflection $\eta$ being picked off at the output of the filter 60 and the signal for the elevator speed $\dot{\eta}$ being picked off between the filters 58 and 60. Then the following equation is obtained:

$$\eta = \frac{1}{1 + \frac{2D}{\omega_o} + \frac{1}{\omega_o} s^2} \tilde{\eta}$$

wherein
$\eta =$ elevator deflection
$\tilde{\eta} =$ output of the elevator-servomotor
$D =$ damping of the elevator system
$\omega_o =$ characteristic frequency of the elevator system.

Figure 2:
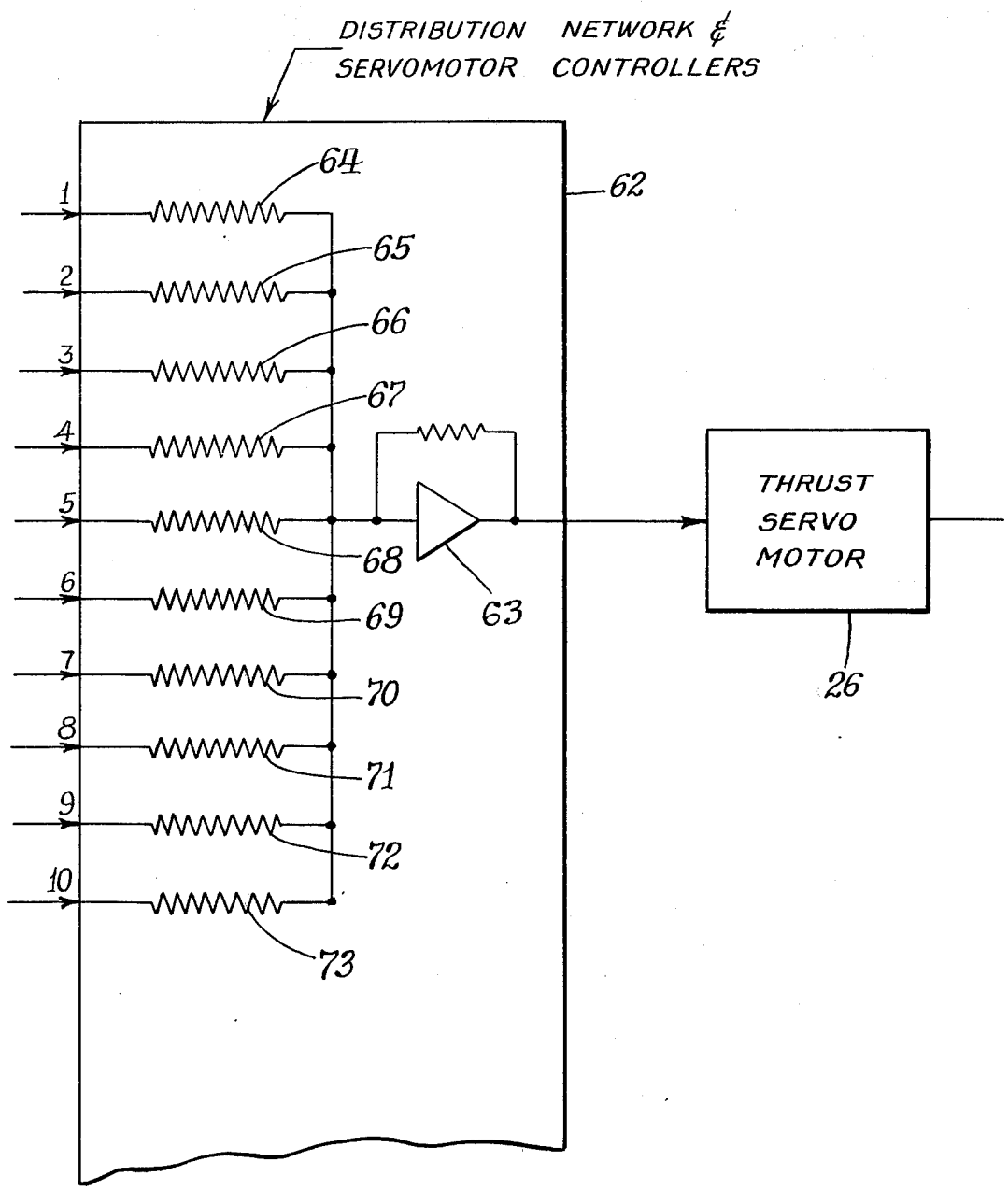
FIG. 2 is a diagram of a portion of the flight controller of FIG. 1 illustrating in greater detail the summing amplifier for linearly combining the signals.

Through the distribution network and servomotor controllers 62, the 12 state variables thus obtained are applied linearly to the servomotors with gains $K_{ij}$ by means of conventional summing networks. Illustrative of each summing network, as shown in FIG. 2 in connection with the signals to the thrust servomotor 26, a summing amplifier 63 is employed with the signals representing the state variables being applied to the amplifier input through respective resistors 64–73.

The state variables $\eta$ and $\dot\eta$, i.e. elevator deflection and elevator speed, as well as the angle of attack deviation $\Delta\alpha$ and its time integral are applied directly to the input of the elevator-servomotor 28. Simulated elevator deflection and elevator speed are only applied to the elevator-servomotor 28 as feedback signals. All other state variables are applied to all servomotors 26, 28 and 30. An analog divider circuit 32 is connected to the input of the elevator-servomotor 28, the state variables — with the exceptions mentioned hereinbefore — being applied to the input of this divider. Divider 32 has applied thereto a dynamic pressure signal from dynamic pressure sensor 33 and acts to divide the input state variable signals by dynamic pressure q thus serving as a rate control means. This is to make allowance for the increase of control surface effectiveness, which is known to increase with increasing dynamic pressure.

A filter 34 of the high-pass type having a transfer function $$\frac{T_6 s}{1 + T_6 s}$$

is connected to the input side of the spoiler servomotor 30 whereby all state variables are applied to the spoiler servomotor 30 through said filter. Thus the spoiler is used to counteract high frequency disturbances.

The gains for the application of the individual state variables to the different servomotors are obtained (using appropriate summing amplifiers such as amplifier 63 illustrated in FIG. 2 and used in connection with input resistors 64–73) from the following feedback matrix:

1. decoupling of the control loops for trajectory and aerodynamic condition of flight,
2. precise guidance of the aircraft along a given trajectory,
3. precise control of the aerodynamic condition of flow,
4. good stability,
5. satisfactory gust suppression (in trajectory, aerodynamic and thrust),
6. elimination of the thermal wind effect,
7. simple generation of the state variables,
8. substantial redundancy in the generation of the state variable,
9. insensitivity to parameters over a large range of airspeeds and
10. performance of one control function by different state variables in different frequency ranges.

These aspects can be taken care of sufficiently with the present combination of state variables. Redundancy of the state variables provides for multiple allowance for specific influences, whereby even in the case of a failure in one channel such influence is still effective in the control. By way of example, for high-frequency operations $$\dot\omega_y \approx \dot\eta.$$

Since both $\dot\eta$ is observed at the output of the elevator model 56, and $\dot\omega_y$ is derived from rate gyro 14 through filter 44, $\dot\eta$ is observed in redundant manner, leading to a reduction of the sensitivity to the parameters of the apparatus.

The pitch angle $\theta$ can also be derived from the measured angle of attack $\alpha$ and the state variables $\dot h$ and $u$ according to the equation $$\theta = \frac{\dot h}{u} + \alpha.$$

The invention is claimed as follows:

1. In an apparatus for controlling the trajectory and aerodynamic condition of flow of an airplane having

| | | | Feedback Matrix | | | | | | | | |
| | | | State variable | | | | | | | | |
| Servo-motor | $\Delta\alpha$ | $\int\Delta\alpha$ | $\tilde u$ | $\dot u$ | $\dot\omega_y$ | $\omega_y$ | $\theta$ | $h$ | $\Delta h$ | $\int\Delta h$ | $\eta$ | $\dot\eta$ |
|---|---|---|---|---|---|---|---|---|---|---|---|---|
| Thrust | $K_{1,1}$ | $K_{1,2}$ | $K_{1,3}$ | $K_{1,4}$ | $K_{1,5}$ | $K_{1,6}$ | $K_{1,7}$ | $K_{1,8}$ | $K_{1,9}$ | $K_{1,10}$ | 0 | 0 |
| Spoiler | $K_{2,1}$ | $K_{2,2}$ | $K_{2,3}$ | $K_{2,4}$ | $K_{2,5}$ | $K_{2,6}$ | $K_{2,7}$ | $K_{2,8}$ | $K_{2,9}$ | $K_{2,10}$ | 0 | 0 |
| Elevator (direct) | $K_{3,1}$ | $K_{3,2}$ | 0 | 0 | 0 | 0 | 0 | 0 | 0 | 0 | $K_{3,11}$ | $K_{3,12}$ |
| Dynamic pressure (adapted) | 0 | 0 | $K_{3,3}$ | $K_{3,4}$ | $K_{3,5}$ | $K_{3,6}$ | $K_{3,7}$ | $K_{3,8}$ | $K_{3,9}$ | $K_{3,10}$ | 0 | 0 |

The different state variables in the described embodiment of the invention are obtained in different manners: Some are obtained by direct measurement, namely $\Delta\alpha$, $\omega_y$, $\Delta h$. Other state variables are derived by filtering from the measured quantities (observation filter). These are, for example, the integrals $\int\Delta\alpha\,dt$ and $\int\Delta h\,dt$ or the pitch acceleration or the pitch angle. Other state variables are obtained by a model simulation which simulates, for example, the performance of the elevator, according to model.

In the present case state variables have been selected to provide:

thrust changing actuator means and control surface actuator means, said apparatus comprising trajectory sensor means for producing an actual trajectory signal, aerodynamic condition of flow sensor means for producing an actual aerodynamic condition of flow signal, trajectory deviation detector means having a command value input and being connected to the trajectory sensor means to produce a trajectory deviation signal indicative of the deviation of the actual trajectory signal from a commanded value, aerodynamic condition of flow deviation detector means having a command value input and being connected to the aerodynamic condition of flow sensor means to produce an aerodynamic condition of flow deviation signal indicative of the deviation of the actual aerodynamic condition of flow signal from a commanded value, and control means connected to the actuator means and to the deviation detector means for controlling the actuators in accordance with said deviation signals, the improvement comprising:

said control means controlling the thrust changing actuator means in response to first control signals, which are related to the signals from both of the deviation detector means by given associated transfer functions, and controlling control surface actuator means in response to second control signals which are related to the signals from both of the deviation detector means by given associated transfer functions.

2. In an apparatus as set forth in claim 1 wherein said transfer functions have been selected to reduce the mutual influence of the variables of the two control signals.

3. In an apparatus as set forth in claim 2, wherein the control means utilizes transfer functions of the signals of the deviation detector means such that a deviation in the trajectory and its correction is substantially without any influence on the aerodynamic condition of flow and a deviation in the aerodynamic condition of flow is substantially without any influence on the trajectory.

4. In an apparatus as set forth in claim 3 which includes additional sensor means for producing signals representative of other flight condition variables of the airplane, the improvement comprising means connecting said control means to said additional sensor means, said control means controlling the actuator means is response to linear combinations of said first and second control signals and additional signals which are the signals from said additional sensor means modified by given transfer functions.

5. In a flight control apparatus for automatically controlling position and aerodynamic condition of flow of an aircraft, comprising devices for producing state variable signals including first measuring means for producing a first signal indicative of aircraft position, second measuring means for producing a second signal indicative of aerodynamic condition of flow, first command signal generating means for producing an aircraft position command signal, second command signal generating means for producing an aerodynamic condition of flow command signal, a first comparator means for comparing said first signal and said aircraft position command signal to produce a position deviation signal, second comparator means for comparing said second signal and said aerodynamic condition of flow command signal to produce a flow condition deviation signal, and at least one measuring means for measuring an aircraft dynamics characteristic and producing a signal indicative of said aircraft dynamics characteristic, a thrust actuator having an input and adapted to vary the thrust of the aircraft in response to signals at the input thereof, and a control surface actuator having an input and an output and adapted to vary the deflection of a control surface of the aircraft in response to signals at the input thereof, said apparatus being characterized by:

circuit means connected to said devices and the inputs of said actuators for applying a plurality of signals at each of said inputs as linear combinations, each signal of said plurality of signals being indicative of one state variable, said plurality of signals including said position deviation signal, said flow condition deviation signal, the time integral of said position deviation signal, the time integral of said flow condition signal, and a signal indicative of aircraft vertical speed, said circuit means comprising at least one of each of the following items:

a. direct connection means for directly applying a state variable signal as one signal out of said plurality b. filter means connected to receive one of said state variable signals and from it produce another state variable signal which then is applied to said inputs as being one of said plurality of signals.

6. A flight control system as claimed in claim 5, wherein said signal producing means further include:

simulator means connected to the output of said control surface actuator to produce a feedback signal representative of the positioning of said control surface in response to said control surface actuator actuation.

7. A flight control system as claimed in claim 5, wherein said signal producing means includes:

first means for producing a first state variable signal indicative of a first state variable and a first combination of first means for directly measuring a second state variable and producing a second state variable signal indicative thereof, and first filter means connected to receive said second state variable signal and designed to produce a third state variable signal, which is also indicative of said first state variable, said third state variable signal being another signal out of said plurality, whereby two signals indicative of said first state variable are produced in redundant manner from two sources of different nature.

8. A flight control system as claimed in claim 7, wherein said first state variable signal producing means comprises a second combination of second means for directly measuring a fourth state variable and producing a fourth state variable signal indicative thereof, and second filter means connected to receive said fourth state variable signal and designed to produce said first state variable signal.

9. A flight control system as claimed in claim 8, wherein said first direct measuring means is an accelerometer for measuring vertical acceleration and producing a signal indicative thereof and said first filter means is adapted to pseudointegrate said vertical acceleration signal, and wherein said second direct measuring means is an altimeter for measuring aircraft altitude and producing a signal indicative thereof and said second filter means is adapted to pseudodifferentiate said altitude signal, whereby said first state variable is vertical speed.

10. A flight control system as claimed in claim 7 wherein said first state variable signal producing means comprise means for measuring aircraft angle of attack, and producing an attack angle signal $\alpha$, means for producing a signal indicative of vertical aircraft speed $\dot{h}$ and means for linearly combining said signals at least approximately in accordance with the formula $$\alpha + \frac{\dot{h}}{u},$$

$u$ being aircraft forward speed, to produce a signal indicative of pitch angle, and wherein said first direct means of said first combination is a rate gyro for measuring pitch rate to produce a pitch rate signal, and said first filter means pseudointegrates said pitch rate signal, whereby two pitch angle signals are produced in redundant manner from two sources of different nature.

11. In a flight control apparatus as set forth in claim 5 wherein said devices for producing said state variable signals include accelerometer sensor means for producing a signal and rate gyro sensor means for producing a signal, said circuit means being connected to all said sensor means for controlling all said actuators in response to functions from all of the sensor means.

12. In a flight control apparatus as set forth in claim 11, including simulator means connected to the output of the control surface actuator to produce a feedback signal representative of the positioning of the control surface in response to said control surface actuator actuation, rate control means having an input connected to the circuit means and an output connected to the control surface actuator means for producing an output signal to the control surface actuator, means connected to said rate control means for applying to said rate control means a dynamic pressure signal to modify the signals received at the input of the rate control means by a transfer function for considering the effectiveness of the control surface increased with increased dynamic pressure, and means to apply the feedback signals from the simulator means as well as the angle of attack deviation and the integral thereof directly to the control surface actuator means, all other signals for the control surface actuator means applied thereto through the rate control means.

13. In an apparatus as set forth in claim 11, wherein said circuit means includes pseudoobserver means and produces the following signals from the sensor means signals and utilizing them in establishing the control of the actuator means:
 a. Deviation of the aerodynamic flight condition (angle of attack) by direct measurement and difference formation with a command value;
 b. Integral of the deviation of the aerodynamic flight condition by strict integration of this deviation;
 c. Speed by measurement of the longitudinal acceleration of the aircraft by means of a longitudinal accelerometer and by pseudointegration thereof with elimination of the stationary final value via a high-pass-low-pass filter $$\left(\frac{T_1 s}{1 + T_1 s}\right)\left(\frac{T_2}{1 + T_2 s}\right).$$

Longitudinal acceleration is integrated by the $$\left(\frac{T_2}{1 + T_2 s}\right)$$

filter, the high-pass filter $$\left(\frac{T_1 s}{1 + T_1 s}\right)$$

eliminating the stationary final value;
 d. Time derivative of the speed from the longitudinal acceleration with elimination of the stationary final value by a high-pass filter $$\left(\frac{T_1 s}{1 + T_1 s}\right);$$

e. Angular acceleration about pitch axis by measuring the angular velocity by means of a rate gyro and pseudodifferentiation via a high-pass filter $$\left(\frac{T_4 s}{1 + T_4 s}\right);$$

f. Angular velocity about pitch axis by direct measurement by means of a rate gyro;
 g. Pitch angle by pseudointegration $$\left(\frac{T_5}{1 + T_5 s}\right)$$

of the angular velocity;
 h. Vertical speed via complementary filters $$\text{and } \left(\frac{T_3}{1 + T_3 s}\right)$$
$$\left(\frac{T_4 s}{1 + T_4 s}\right)$$

on the one hand by measuring the vertical acceleration by means of a vertical accelerometer and pseudointegration thereof, and on the other hand from the altitude deviation by pseudodifferentiation via a high-pass filter;
 i. Altitude deviation by direct altitude measurement by means of an altimeter and difference formation with a command value;
 j. Time integral of the altitude deviation by strict integration of the latter.

* * * * *